DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 29, 1970

878 O.G. 1148

T878,016

ELECTROPHOTOGRAPHIC PROCESS IN WHICH A CHARGED AND IMAGE-WISE EXPOSED PHOTOCONDUCTOR CONTACTS A PHOTOSENSITIVE SILVER HALIDE EMULSION AND FORMS A DEVELOPABLE IMAGE THEREIN

Paul B. Gilman and Joseph Y. Kaukeinen, both of Kodak Park Works, Rochester, N.Y. 14650

Filed Dec. 22, 1969, Ser. No. 887,411

Int. Cl. G03g *13/00, 13/14*

U.S. Cl. 96—1

No Drawing. 36 Pages Specification

A process of rendering visible electrostatic charge patterns is described. The process involves the formation of a charge pattern on a charge-retaining member which is then placed in contact with a silver halide element to form a latent image on the element which is then processed by standard photographic techniques to form a visible silver image. The process eliminates detrimental solvent and abrasive action which occur in standard electrophotographic development techniques.